INVENTORS
ANDRÉ BRANDENBURG.
ANDRÉ JOLIVET.

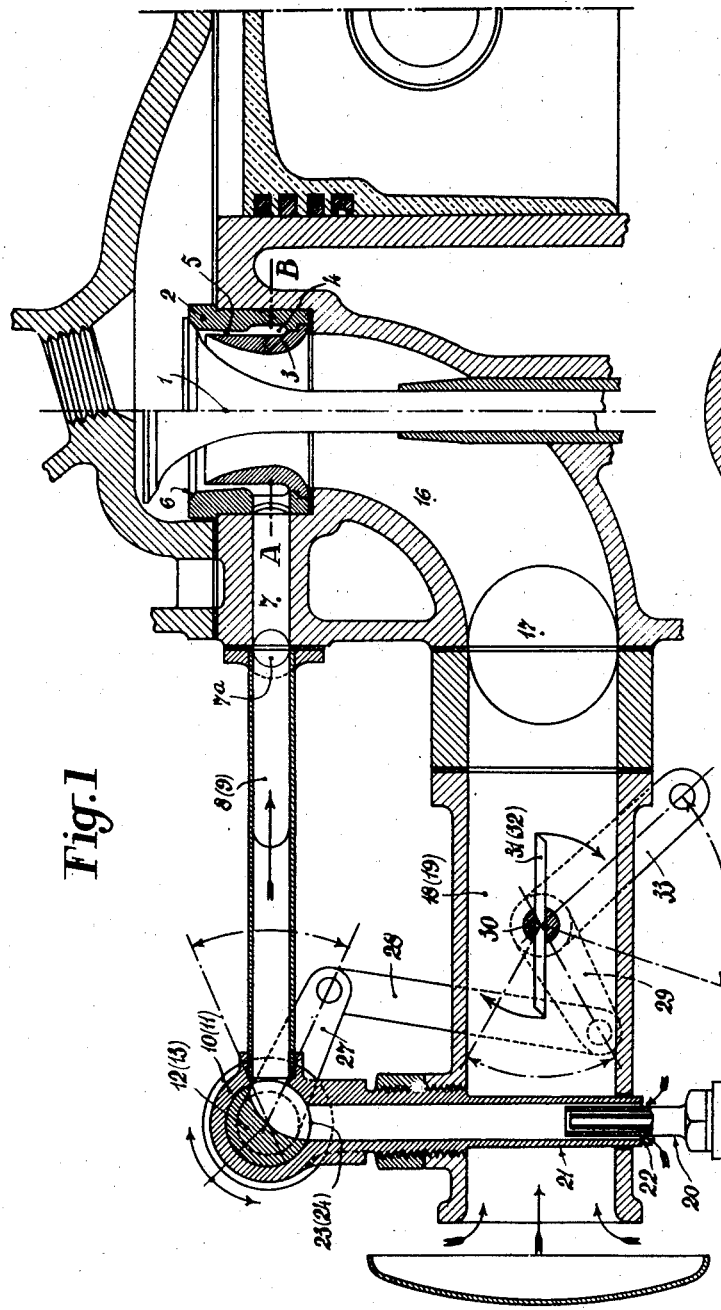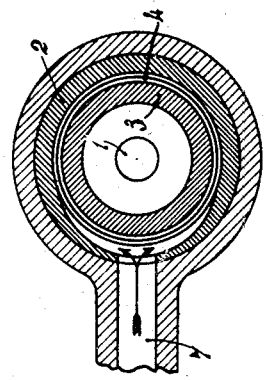

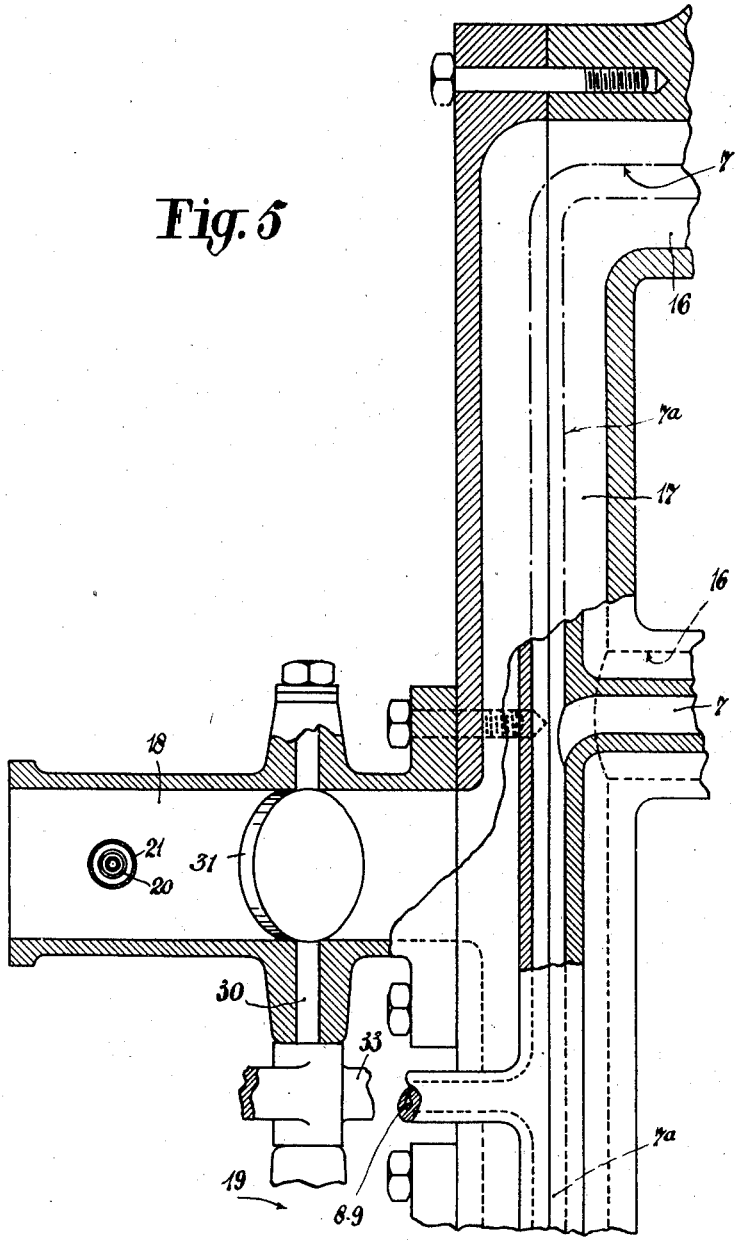

Patented Apr. 27, 1948

2,440,572

UNITED STATES PATENT OFFICE 2,440,572

DEVICE FOR THE SEPARATE SUPPLY OF THE FUEL AND OF THE COMBUSTION AIR FOR EXPLOSION ENGINES

André Brandenburg and André Jolivet, Paris, France; said Brandenburg assignor to Maurice Deloye, Paris, France Application January 3, 1938, Serial No. 183,222 In France January 18, 1937

Section 3, Public Law 690, August 8, 1946 Patent expires January 18, 1957

8 Claims. (Cl. 123—119)

The invention relates to an improved device for separately supplying liquid fuels of different type, as well as combustion air through the seat of the admission valve of each cylinder of an explosion engine.

The said device, which is of simple construction and easy to install, permits the working or normal running of the engine with heavy liquid fuel, but provides for the use of light liquid fuel, for instance, gasoline, for starting the engine while cold.

According to the invention, the device, which comprises the so-called seat of the admission valve, is so constructed that the fuel mixed with a relatively small quantity of air, meets very hot walls which cause the fuel to vaporize and discharge in the form of a continuous circular sheet, at the inlet of the driving cylinder, before it meets the combustion air which enters cold at the centre of this sheet.

Owing, to the fact on one hand, that the rich mixture meets a very hot wall before entering the working cylinder, and before meeting the main combustion air, and, on the other hand, to the continuous shape of a circular slit, the very important result, which is exactly the substantial result desired, is thus obtained, i. e. that when a heavy fuel is used, such as fuel-oil, the rich mixture is entirely vaporized by the heat. These vapors are then perfectly mixed with the outer air which is cold and at the atmospheric pressure in the working cylinder. The mixture between this main combustion air and the rich vaporized mixture is facilitated by the fact that, at the inlet of the working cylinder, the combustion air is entirely surrounded by a sheath formed by the vapors of the rich mixture which escape through the continuous circular slit.

Under these circumstances, the use of heavy fuels in explosion engines becomes practical, which is the result sought for a long time.

Besides, in order to be able to use at will a light fuel (principally for the starting of the engine) or a heavy fuel for the normal running, it is necessary to foresee means permitting the quick and easy passage from the running with light fuel to the running with heavy fuel, and vice-versa.

The device has other advantageous features which will appear from the following description.

In the accompanying drawings:

Fig. 1 is a vertical section of the inlet device.

Fig. 2 is a section of the seat of the inlet valve according to A—B of Fig. 1.

Figure 5 shows, partly in section, some pipes of the device.

Figure 3:
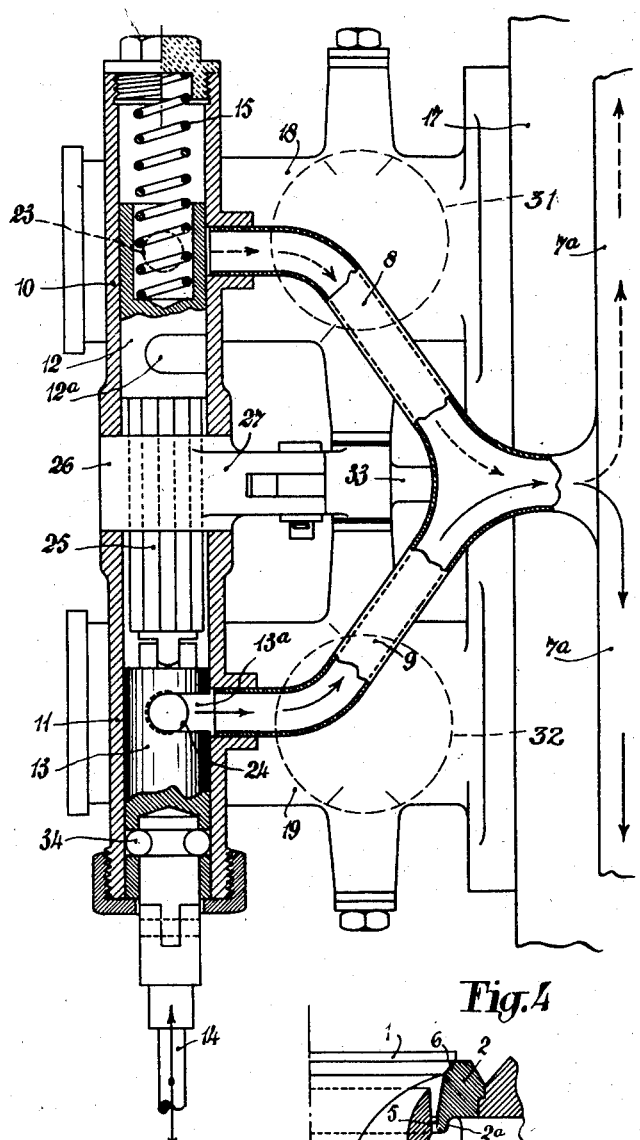
Fig. 3 is a sectional plan view showing the driving slide valve.

In the drawings, 1 is the inlet valve of one of the cylinders of the engine. The seat of this valve consists in an exchangeable ring 2, in the interior of which is mounted an annular diffuser 3 leaving between itself and the ring 2 a circular space 4 narrowed at 5 and ending near the properly called seat 6. The space 4 discloses, as shown in Fig. 2, the largest section at the outlet of the pipe and said section then diminishes gradually on either side of this outlet. The circular part 5 widens into the so-called seat 6, but ceases to exist a little beneath this seat.

With the circular space 4, communicates, for every cylinder of the motor, a pipe 7 branched upon a main pipe 7a divided into two branches 8 and 9 which open into respective chambers 10 and 11 in which may turn and slide two slide valves 12 and 13 which may be made to slide longitudinally by means of a push rod 14 against the action of a return spring 15.

The central part of the annular diffuser 3 is, for every cylinder, set in connection with the external air through a pipe 16 forming one of the branches of a delivery pipe 17 comprising, moreover, two pipes corresponding respectively to the carburettor for light fuel and to the carburettor with heavy fuel.

The spray nozzle 20 of each of the said carburettors, which are of any suitable known type, is engaged into a pipe 21 between which and the spray nozzle 20 is but an annular space 22 through which comes, during the suction, a small amount of air for vaporising and carrying along the liquid fuel. The pipe 21 of one of the carburettors ends at 23 in the chamber 10 while the pipe 21 of the other carburettor ends, at 24, into the chamber 11. However, these ports 23, 24 may be closed more or less, or even totally, by the slide valves 12, 13, respectively.

In Fig. 3, the port 24 is shown as being completely open (as represented also in Fig. 1), while the port 23 is completely closed by the slide valve 12.

The two slide valves 12, 13 are connected together by a rod of polygonal section 25 passing into a sleeve 26 of corresponding internal section and connected with a lever 27 connected through a link or connecting rod 28 to a lever 29 secured to a shaft 30 common to the two throttle valves 31, 32 mounted, respectively in the pipes 18 and 19. The said shaft 30 is controlled by a lever 33 which can be operated by means of a handle or a pedal.

The connection between the pushing rod 14 and the slide valve 13 is obtained by means of a ball bearing 34 allowing the slide valve to turn without driving the rod 14 which may be operated at a certain distance by any suitable means.

The method of operation is as follows:

*Starting while cold.*—Assuming that an engine of the motor vehicle is being used, the controlling means for the rod 14 is first placed in such a position that the port 24 (which will be supposed to correspond with the light fuel carburettor) will be uncovered by the slide valve 13. The said condition moreover is assuming that the device for controlling the throttle valves 31, 32 and the slide valves 12, 13 is set to a position in which the throttle valve 31, 32 of every pipe 18, 19 is almost completely on closure as well as the slide valve 13.

Accordingly, the mixture admitted into the cylinders of the motor owing to the first suctions is very rich in fuel and the starting may take place under the same conditions as in the usual engines provided with a carburettor with starter. The liquid fuel, being already vaporised by the small amount of air admitted at 22, meets at the apex of the annular diffuser 3, under the head of the valve 1, with the air which passes the throttle valves 31, 32.

When the engine has turned for some time under these conditions, the pedal controlling the lever 33 can be depressed in order to open progressively (through the medium of the throttle valves 31, 32) the inlet of combustion air at the same time as the passage between the pipes 21 and 9 (through the slide valve 13). The engine can thus run with light fuel as long as desired. After running a certain length of time with light fuel the engine becomes warm and can operate with heavy fuel, due to the fact that the part 2 is very warm because it is in direct contact with the body of the motor cylinder, while on the other hand the part 3 is not so warm because both of its circular faces are in contact with cold air.

*Running while warm.*—As soon as the temperature of the engine is considered as being sufficiently high, the operation with heavy fuel (to which would then correspond to the pipe 8, the slide valve 12 and the orifice 23) may be adopted. To this purpose, the controlling member of the rod 14 may be acted upon in such manner that the said rod will be moved towards the spring 15 which is compressed and this till the two slide valves 12, 13 will be brought to such a position that the hollow portion 13a of the slide valve 13 will move away from the pipe 9 and the port 24, which close almost at same time as the part 12a of the slide valve 12 uncovers the port 23 and the pipe 8.

The heavy, or assumed heavy, fuel then comes through the spray nozzle 20 of the corresponding carburettor and through the pipes 21, 8, 8a and 7, vaporised by a small amount of air admitted at 22 and, after having undergone a gasification due to the contact with the very hot part 2, meets with the air body arriving through 18, 19, 17 and 16. When in contact with the said body or mass of cold air (the same not having been heated by the part 3 which is practically cold), the fuel is pulverized and comes into the working cylinder and forms an eddy which formation is facilitated by the annular shape of the diffuser. Moreover, owing to the progressive widening of the vertical section of the circular slit 5 (Fig. 1), the fuel which is gasified on contact with the wall of the ring 2, which becomes hotter as it approaches the so-called seat 6, may expand while flowing to the cylinder. Thus, the breaking of the suction in the circular slit 5 is avoided.

It should be noted that, as shown in Figure 2, the chamber 4 is widest in the transverse plane where it is in communication with the pipe 7 and then diminishes progressively. This arrangement is intended to ensure the inlet of the rich mixture in all the extent of the chamber 4.

It is a matter of importance to observe that the air of combustion arriving at 16 is at the atmospheric pressure as the areas of passage afforded to the same at 18, 19, 17 and 16 do not show any venturi or any other important reduction of section. The fact that, in the drawings, the duct 21 passes through the pipe 18 (19) does not impair in any way the preceding remark. The duct 21 might, moreover, be disposed outside the pipe, as the arrangements as represented have for their purpose to secure the strength of mounting.

Now, owing to the fact that air is admitted at the atmospheric pressure, the load which is admitted within a given time is stronger and the resulting power is accordingly increased.

The control of the run of the warm engine is effected, as in the ordinary engines, by means of an accelerating pedal acting upon the throttle valves 31, 32, at same time as upon the slide valves 12 and 13. Under these conditions, the quantity of fuel admitted at 7 remains proportional to the quantity of air arriving at 16.

But it is possible to modify at will the proportion of fuel and of combustion air in acting upon the rod 14 so as to throttle more or less the port 23 (or 24) by way of a rectilinear motion of the slide valves 12, 13 and that for every angular position of the said slide valves and of the throttle valves 31, 32. It is thus possible to obtain an estimation of fuel between two outmost limits: richness of the maximum power and richness of maximum economy.

Figure 4:
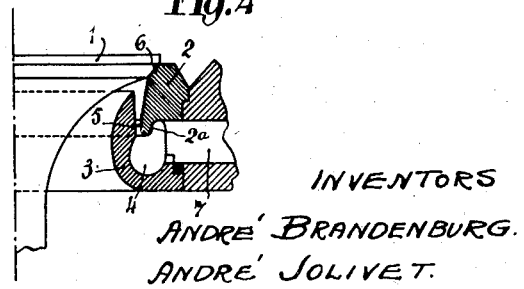
Fig. 4 shows a modification of the shape of the member serving as a seat for the valve.

Fig. 4 shows a modification in which the hot member 2 is provided with a circular tip or flange 2a, which increases advantageously the hot surface met by the fuel flowing from the pipe 7.

The fact that the outlet of the circular slit 5 is never closed, even when the valve 1 bears on its seat 6, has the advantage that, during all the time comprised outside the admission period, that is to say, for instance, in the case of a four stroke engine with four cylinders supplied by means of a single pipe 7a for the supply of fuel, each circular chamber 4 of the three cylinders, which are not at the suction stroke, is subjected, through its conduit 7 and the common pipe 7a, to a suction effect due to the fourth cylinder. This suction is felt in the three other chambers 4 and their slits 5 through which the fresh air from the conduit 16 is supplied in a counter direction.

This air impinges on the sheet of liquid fuel which would have a tendency to be formed on the walls of the parts 5, 4, 7 and 7a. Finally, a small part of this air may be mixed with the fuel already mixed with some driving air and sucked in the cylinder which is at the compression stroke. As the air thus sucked in a counter direction is heated on contact with the hot wall of the part 2, its addition in the fuel mixture ensures a light preliminary and advantageous heating of this fuel immediately before its entrance into the chamber 4.

The process and the arrangements which have just been described possess, moreover, the great advantage of securing an almost complete combustion, owing, particularly, to the vaporisation, the gasification and the pulverization of the liquid fuel before the same is mixed with the air of combustion.

What we claim is:

1. A device for separately supplying fuel and combustion air to the cylinders of explosion engines, comprising, an admission valve opening into the combustion chamber, a removable member formed with two concentric parts forming a ring like unit, the outer part of said unit having a seat for said admission valve, and the said unit being provided between the concentric parts with a circular chamber communicating with the source of fuel supply, and also provided with a continuous annular slit having its inlet end communicating with said chamber and having its outlet end located beneath the seat on which the valve bears, means producing a rich mixture for ensuring its vaporization by contact with a hot wall of the outer part of the said unit, and means for maintaining the inner part cool by the surrounding fuel and combustion air flowing through the center.

2. A device for supplying fuel and combustion air to the cylinders of explosion engines, in which the fuel in the form of a rich mixture and combustion air are supplied separately under the admission valve which opens into the combustion chamber, comprising, a unit composed of two concentric removable and annular parts, the outer part comprising at its upper portion the seat for said admission valve, and the inner part having its top slightly beneath this seat, and a continuous circular chamber and a continuous circular slit being provided between both annular parts for connecting the said circular chamber with the working cylinder when the valve is lifted from its seat.

3. In a device for separately supplying a rich fuel mixture and combustion air to the admission valve of an explosion engine, a unit comprising the valve seat of the valve opening into the combustion chamber and formed of two concentric and separately removable portions having therebetween a circular chamber and an annular slit for receiving the rich mixture and supplying it to the working cylinder, the outer portion of the said unit which is the hottest being provided with a flange projecting into said circular chamber for increasing the heating surface met by the rich mixture during its travel to the working cylinder.

4. In a device for separately supplying a rich fuel mixture and combustion air to the admission valve of an explosion engine which opens into the combustion chamber, a unit formed at its top with a valve seat for said admission valve, the said unit comprising two concentric separable parts formed at their inner faces to provide a circular chamber and an annular slit for receiving the rich mixture and supplying it in the form of a thin sheet which is hot, annular and gasified and which meets the mass of cold combustion air during its travel to the working cylinder, the outer of said concentric parts having its upper annular portion thickened in order to project into the working cylinder in order to better absorb the heat to be transmitted to the rich mixture, said thickened portion being provided at its inner edge with the said valve seat.

5. In a device for separately supplying a rich fuel mixture and combustion air to a cylinder of an explosion engine which has an admission valve opening into the combustion chamber, a unit comprising a valve seat for said admission valve and being formed of two concentric removable parts formed to provide therebetween a circular chamber connected by a conduit with a source of rich mixture supply, said circular chamber being provided with its maximum transverse sectional area at the point of connection with said conduit, said transverse sectional area then being reduced progressively from said point in order to ensure the supply of the rich mixture over all the circular space of said circular chamber.

6. In a device for separately supplying a rich fuel mixture and air to a cylinder of an explosion engine which has an admission valve opening into the combustion chamber, the seat for said valve comprising a unit formed of two parts defining a connecting chamber therebetween, a central conduit for conducting air to the combustion chamber, a conduit for supplying the chamber with a rich fuel mixture, a nozzle in said conduit including at a point anterior to the nozzle a narrow passage adapted for the supply of a small amount of air and for forming a vapor by its mixture with the fuel and for driving said rich mixture to the working cylinder through said connecting chamber.

7. In a device for separately supplying a rich fuel mixture and combustion air to the admission valve opening into the combustion chamber a central conduit for conducting air to the combustion chamber of an explosion engine, said valve comprising a unit forming a valve seat and formed of two concentric removable portions, a circular chamber and an annular slit between said two portions for receiving the rich fuel mixture and supplying it to the working cylinder, the vertical sectional area of the slit increasing from said circular chamber toward the hottest part of the hot portion of the outer member of the said unit in order to allow expansion of the fuel vapors supplied to the inside of the working cylinder.

8. A unit comprising the seat for the admission valves of an explosion engine, said unit including an outer portion heated by the combustion of the gases within the working cylinder of the engine and an inner portion cooled by the rich fuel mixture and the combustion air, the said unit comprising between said portions a continuous circular slit in communication with a continuous circular chamber, the said chamber being connected with a conduit branched, in the case of an engine with several cylinders, on the general pipe for the supply of rich mixture, the said unit being provided with a conduit for the supply of combustion air, the said slit opening towards the working cylinder, under the seat, in order to ensure a constant communication between, on one hand, the space comprising the slit, the chamber, the conduit and the common pipe for the rich fuel mixture supply and, on the other hand, the conduit for the supply of fresh air.

ANDRÉ BRANDENBURG.
    ANDRÉ JOLIVET.

REFERENCES CITED

The following references are of record in the file of this patent:

UNITED STATES PATENTS

| Number | Name | Date |
|---|---|---|
| 1,245,511 | Riotte | Nov. 6, 1917 |
| 1,504,322 | Brush | Aug. 12, 1924 |
| 1,576,109 | Forman et al. | Mar. 9, 1926 |
| 1,905,029 | Aseltine | Apr. 25, 1933 |
| 1,941,334 | Aseltine | Dec. 26, 1933 |
| 1,946,603 | Aseltine | Feb. 13, 1934 |
| 1,966,329 | Aseltine | July 10, 1934 |
| 2,033,211 | Tice | Mar. 10, 1936 |
| 2,082,666 | Ulrich | June 1, 1937 |
| 2,084,340 | Hartsough | June 22, 1937 |